(12) United States Patent
Olofsson

(10) Patent No.: US 6,438,956 B1
(45) Date of Patent: Aug. 27, 2002

(54) METHOD OF OPERATING AN INTERNAL-COMBUSTION ENGINE, AND INTERNAL-COMBUSTION ENGINE

(75) Inventor: Eric Olofsson, Ronninge (SE)

(73) Assignee: Saab Automobile AB (SE)

( * ) Notice: Subject to any disclaimer, the term of this patent is extended or adjusted under 35 U.S.C. 154(b) by 0 days.

(21) Appl. No.: 09/806,317

(22) PCT Filed: Oct. 4, 1999

(86) PCT No.: PCT/SE99/01758

§ 371 (c)(1),
(2), (4) Date: Apr. 20, 2001

(87) PCT Pub. No.: WO00/20745

PCT Pub. Date: Apr. 13, 2000

(30) Foreign Application Priority Data

Oct. 5, 1998 (SE) .............................................. 9803367

(51) Int. Cl.⁷ ............................................... F02B 33/44
(52) U.S. Cl. ...................... 60/605.1; 60/280; 123/562
(58) Field of Search ............................... 60/605.1, 602, 60/280; 123/562

(56) References Cited

U.S. PATENT DOCUMENTS

| | | | |
|---|---|---|---|
| 4,873,961 A | 10/1989 | Tanaka | ....................... 123/564 |
| 5,125,235 A * | 6/1992 | Yanagihara et al. | ........ 60/605.1 |
| 5,417,068 A | 5/1995 | Olofsson | .................... 60/605.1 |

FOREIGN PATENT DOCUMENTS

| | | | | |
|---|---|---|---|---|
| DE | 38 21 935 A1 * | 2/1990 | .................. | 60/602 |
| EP | 04041114 | 12/1990 | | |
| GB | 2185286 | 7/1987 | | |
| JP | 361164039 A * | 7/1986 | ................. | 123/562 |
| JP | 405263671 A * | 10/1993 | ................. | 60/605.1 |
| WO | WO-94/07010 | * 3/1994 | .................. | 60/602 |

* cited by examiner

Primary Examiner—Thomas Denion
Assistant Examiner—Thai-Ba Trieu
(74) Attorney, Agent, or Firm—Ostrolenk, Faber, Gerb & Soffen, LLP

(57) ABSTRACT

In an internal-combustion engine (1) of the Otto type, in which exhaust gases are used in order to drive a turbocompressor (14, 15) for supercharging the engine, the engine is designed in such a manner that it can, at high load, be run with a lean mixture during supercharging, the air/fuel ratio being at least 19:1. The lean mixture is brought about by virtue of the fact that the charging pressure increases while the fuel quantity is maintained. The engine is advantageously provided with a divided exhaust-gas discharge in order to improve the operating characteristics.

5 Claims, 1 Drawing Sheet

METHOD OF OPERATING AN INTERNAL-COMBUSTION ENGINE, AND INTERNAL-COMBUSTION ENGINE

TECHNICAL FIELD

The invention relates to a method of operating an internal-combustion engine.

STATE OF THE ART

In a conventional turbo-engine, that is to say a supercharged engine, which has a geometrical compression ratio which is acceptable from the point of view of fuel consumption, it is always necessary at high load to set ignition relatively late so as to avoid knocking. This means that the effective expansion ratio decreases and that less work can be extracted from the combusted gas. A high exhaust-gas temperature at high engine speed also results.

Moreover, if the turbo-engine has a relatively small turbine in order to improve torque and response at low engine speeds, a further increased exhaust-gas temperature is obtained as a result of reduced mass flow through the turbine. The usual method of lowering the exhaust-gas temperature is to run the engine with an extremely rich mixture (with an air/fuel ratio of the order of 11:1) at high engine speeds.

This results in the temperature increase during combustion being reduced, which results in cooler exhaust gases. At the same time, however, there is a great increase in emissions of uncombusted hydrocarbons and of carbon monoxide. Conversion in the catalyst is insufficient as a result of a lack of oxygen in the exhaust gases.

A further disadvantage is that the fuel consumption increases by roughly 30%.

An advantage, however, is that the quantity of nitrogen oxides decreases in comparison with the case of a stoichiometric mixture.

A transition to stoichiometric operation would improve the situation as far as emissions are concerned but would on the other hand cause a decrease in power of the order of 25% as a result of the need to set ignition earlier in order to limit the increase in the exhaust-gas temperature which otherwise occurs. However, ignition being set earlier results in a greatly increased maximum pressure in the cylinder with the attendant risk of knocking. This in turn leads to a significant reduction of the charging pressure being necessary. Overall, this would result in great problems for turbo-engines.

THE OBJECT OF THE INVENTION

The aim of the invention is to improve the characteristics of a turbo-engine, in particular at high load. Another aim is to bring about a cost-effective solution.

DESCRIPTION OF THE INVENTION

The aim of the invention is achieved on the one hand by using an operating method in which at high load the engine is run with a lean mixture during supercharging, the air/flow ratio being at least 19:1.

By making it possible to operate the engine, with a lean mixture during supercharging and at high load, it is possible to reduce to a significant extent the previously common high emissions of uncombusted hydrocarbons and of carbon monoxide during running of a turbo-engine at high load. Moreover, a lower fuel consumption is achieved.

The lean mixture is brought about by increasing the charging pressure while maintaining the fuel quantity. Operation and engine are especially advantageous when the technique using a divided exhaust-gas period is used in order to obtain efficient turbine operation and efficient cylinder emptying during the exhaust stroke.

Further features and advantages of solutions according to the invention emerge from the description and the other patent claims.

The invention will be described in greater detail below with reference to exemplary embodiments shown in the appended drawing.

DESCRIPTION OF EXEMPLARY EMBODIMENTS

Figure 1:
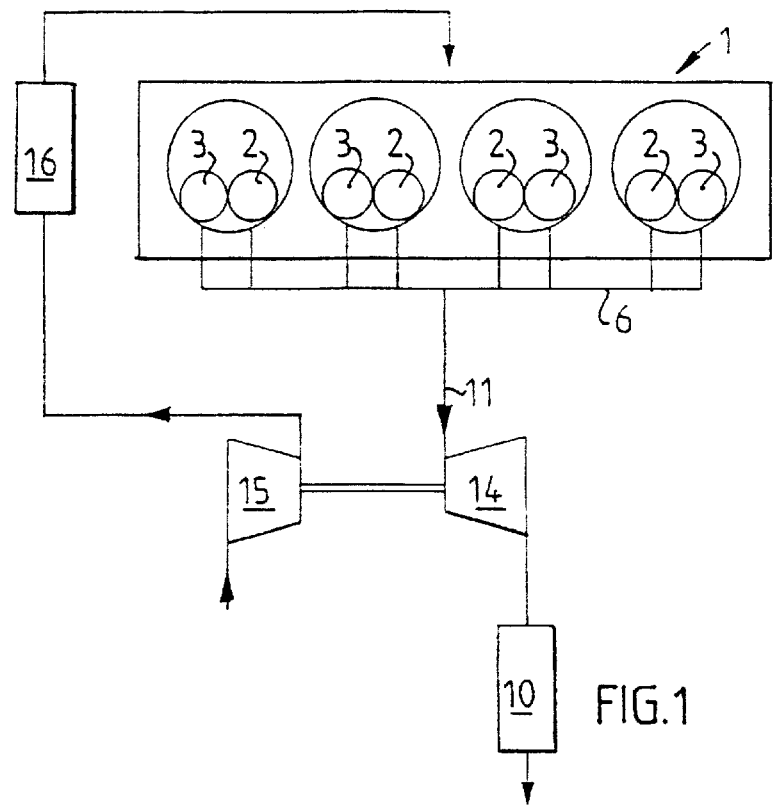
FIG. 1 shows an internal-combustion engine according to the invention provided with a turbocompressor.

FIG. 1 shows diagrammatically a multicylinder internal-combustion engine 1 of the Otto type made according to the invention. In this case, the cylinders of the engine each have two exhaust valves 2 and 3, via which exhaust gases are conducted out to an exhaust manifold 6 common to the cylinders. The manifold is connected via a first exhaust pipe 11 to an exhaust-gas turbine 14 which drives a compressor 15 for supercharging the engine. The charge air is in this case cooled in an intercooler 16 before it is taken into the engine in a manner which is not shown in greater detail. Arranged downstream of the exhaust-gas turbine 14 is a catalyst 10 and one or more silencers (not shown).

Figure 2:
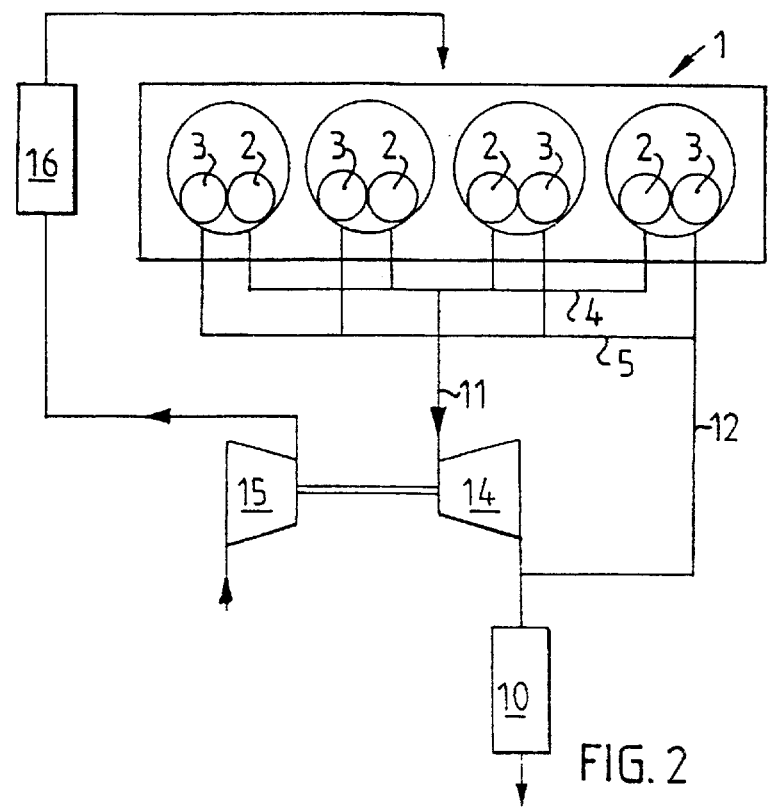
FIG. 2 shows an engine similar to that in FIG. 1 but in an embodiment for a divided exhaust-gas period.

The engine 1 shown in FIG. 2 differs from the engine in FIG. 1 in that the exhaust system is made differently. In this case, a first exhaust valve 2 in each cylinder is connected to a first exhaust manifold 4 and a second exhaust valve 3 in each cylinder is connected to a second exhaust manifold 5. Only the first exhaust manifold 4 leads to the exhaust-gas turbine 14 while the second exhaust manifold 5 opens, via a second exhaust pipe 12, downstream of the exhaust-gas turbine 14, before the catalyst 10. The exhaust valves 2 and 3 have different open times, so that the first, strong part of each exhaust-gas pulse is conducted to the exhaust-gas turbine 14, while the remaining weak part of each exhaust-gas pulse is conducted past the exhaust-gas turbine 14. This makes possible better emptying and charging of the cylinders, and in this way provides a more efficient engine. The principle of a divided exhaust-gas period is known from GB 2 185 286.

According to the invention, the engine is operated in such a manner that, at high load, a lean mixture is produced instead of the previously usual rich mixture. By means of the compressor 15, such supercharging is generated that an air/fuel ratio of at least 19:1, suitably 20:1, is achieved.

By keeping the fuel quantity constant at a level which corresponds to stoichiometric combustion at normal charging pressure, the air/fuel ratio increases at the same rate as the charging pressure. The lean mixture results in the knocking tendency not increasing with the charging pressure.

It has been shown that the increase in the maximum pressure in the cylinder relative to the charging pressure amounts to only roughly ⅓ compared with if the air/fuel ratio is kept constant while the charging pressure increases.

When the running situation of a vehicle changes, that is to say in transient states of the engine, it is desirable to use stoichiometric operation and normal charging pressure. In those cases when the load remains high after transition from a lower load, it is desirable, after a few seconds, to increase the charging pressure suddenly, so that the air/fuel ratio is changed rapidly from the stoichiometric ratio 14.6:1 to roughly 20:1. The fuel quantity is kept constant or somewhat reduced during this pressure stage, which results in the torque not being affected.

The purpose of this pressure increase is to avoid operation at an air/fuel ratio in the range of roughly 15–18:1, where the content of nitrogen oxides is high.

As mentioned, use of a lean mixture at high load (full throttle) requires increased charging pressure in order to maintain the power. This can result in an increase in the negative low-pressure cycle in connection with exhaust-gas discharge from the engine, which can jeopardize the possibility of maintaining the power.

There is also a risk that a lean mixture at high load can lead to excessive cycle-to-cycle variations. These problems are reduced by using the principle of the divided exhaust-gas period, according to FIG. 2.

By virtue of the fact that the exhaust valves in each cylinder open and close differently, the first, strong part of an exhaust-gas pulse can be conducted via the exhaust-gas turbine, while the remaining, weaker exhaust-gas pulse can be conducted past the exhaust-gas turbine. This makes possible better emptying of the cylinder, so that residual gases are almost entirely eliminated, which to a great extent reduces the knocking tendency in the next phase. This in turn makes it possible to select a more favourable ignition time.

Operation with a lean mixture makes possible a greatly improved fuel economy in the load/engine speed range above 1500 kPa indicated effective mean pressure/3500 rpm and reduces the quantity of uncombusted hydrocarbons and carbon monoxide in the exhaust gases by at least one order of magnitude in this load/engine speed range. In combination with the principle of the divided exhaust-gas period, a fuel-saving potential of at least roughly 30% is achieved at high load.

As mentioned, the fuel/air ratio in the lean mixture should be at least roughly 19:1 but can advantageously be 20:1. If appropriate, the mixture can be made even leaner, depending on the stability of the combustion system.

The oxygen surplus thus brought about in the exhaust gases imposes different requirements with regard to the catalyst and emission control but also brings the advantage that the quantity of soot in the exhaust gases can be reduced.

What is claimed is:

1. Method of operating an internal-combustion engine of the Otto type, comprising:
discharging exhaust gases from a plurality of cylinders of the engine for driving a turbocompressor which has an exhaust-gas driven turbine for supercharging the engine, wherein at low load, running the engine with a stoichometric air-fuel mixture ratio, and at high load, running the engine with a lean air-fuel mixture ratio during supercharging, the fuel quantity being kept at a level corresponding to stoichiometric conditions at normal charging pressure,
the method further comprising:
increasing the charging pressure above the normal charging pressure in a single stage until the stoichiometric air-fuel mixture ratio increases to the lean air-fuel mixture ratio of at least 19:1 while maintaining the fuel quantity level during a shift to the lean air-fuel mixture; and
dividing an exhaust-gas discharge pulse from the cylinders such that a first part of the exhaust-gas discharge pulse is conducted to the turbine of the turbocompressor while a subsequent part of the same exhaust-gas discharge pulse is conducted past the turbine of the turbocompressor.

2. Method according to claim 1, wherein the increased air/fuel ratio is 20:1.

3. A method of operating an internal combustion engine of the Otto type, wherein the combustion engine comprises a plurality of cylinders, each cylinder has a first and second exhaust valve, first and second manifolds connected to the first and second valves, respectively, and a turbocompressor for delivering intake air to the engine and having an exhaust-gas driven turbine connected to the first manifold,
the method comprising:
delivering intake air to the engine at normal charging pressure to obtain a stoichiometric air/fuel mixture ratio while the engine operates at low load;
increasing charging pressure of the intake air above the normal charging pressure in a single stage until the stoichiometric air-fuel mixture ratio increases to a lean air-fuel mixture ratio of at least 19:1 at high load imposed on the engine while maintaining a fuel quantity level unchanged during a shift to the lean air-fuel mixture ratio; and
opening the first valves for feeding an initial portion of an exhaust-gas discharge pulse from the cylinders through the first manifold to an inlet of the turbine, and subsequently to the opening of the first exhaust-gas valves, opening the second exhaust gas valves to discharge a residual portion of the exhaust-gas discharge pulse via the second manifold conveying the residual portion past the turbine and opening downstream therefrom.

4. The method defined in claim 3, wherein the charging pressure is increased after the engine has been operating at the high load for a period of a few seconds.

5. An internal combustion engine of the Otto type, comprising:
a plurality of cylinders, each cylinder having a first and second exhaust-gas valve;
first and second exhaust manifolds connected to the first and second exhaust-gas valves, respectively, for conveying divided initial and residual portions of a discharge gas pulse from the cylinders;
a turbocompressor for delivering intake air to the combustion engine and having an exhaust-gas driven turbine, wherein the turbocompressor supplies intake air into the combustion engine at a first charging pressure to obtain a first stoichiometric air/fuel mixture ratio when the engine operates at a low load, and increases the charging pressure in a single stage above the first charging pressure until the stoichiometric air-fuel mixture ratio increases to a lean air-fuel mixture ratio of at least 19:1 when the engine operates at high load while maintaining a fuel quantity level constant during a shift to the lean air-fuel mixture ratio;
the first and second exhaust valves being operable so that when intake air is supplied at the supercharging pressure, the first exhaust gas valves open first to feed the initial portion of the discharge gas via the first manifold to an inlet of the turbine, and the second exhaust gas valves open subsequently to the opening of the first valves to discharge the residual exhaust-gas flow of the discharge exhaust gas pulse via the second manifold conveying the residual exhaust-gas flow past the turbine and opening downstream therefrom.

* * * * *